(12) United States Patent
Verma et al.

(10) Patent No.: US 12,380,195 B2
(45) Date of Patent: Aug. 5, 2025

(54) USING A DIGITAL BADGE TO ACCESS MANAGED DEVICES

(71) Applicant: Omnissa, LLC, Mountain View, CA (US)

(72) Inventors: Gaurav Verma, Bangalore (IN); Suchit Shivashankar, Bangalore (IN); Karthikeyan Palanisamy, Bangalore (IN); Sruthi Surendran, Kozhikode (IN)

(73) Assignee: Omnissa, LLC, Mountain View, CA (US)

( * ) Notice: Subject to any disclaimer, the term of this patent is extended or adjusted under 35 U.S.C. 154(b) by 42 days.

(21) Appl. No.: 17/572,675

(22) Filed: Jan. 11, 2022

(65) Prior Publication Data

US 2023/0161860 A1   May 25, 2023

(30) Foreign Application Priority Data

Nov. 19, 2021 (IN) .............................. 202141053343

(51) Int. Cl.
  *G06F 21/00*  (2013.01)
  *G06F 21/35*  (2013.01)
(52) U.S. Cl.
  CPC .................................. *G06F 21/35* (2013.01)
(58) Field of Classification Search
  CPC ......... G06F 21/34; G06F 21/35; H04L 63/08; H04L 63/0823; H04L 63/083; H04L 63/0853; H04L 63/107
  See application file for complete search history.

(56) References Cited

U.S. PATENT DOCUMENTS

| | | | | |
|---|---|---|---|---|
| 8,739,264 | B1* | 5/2014 | Eddings | .................. G06F 21/35 726/28 |
| 10,701,067 | B1* | 6/2020 | Ziraknejad | ............ H04W 12/63 |
| 2016/0014118 | A1 | 1/2016 | Da | |
| 2016/0093127 | A1 | 3/2016 | Evans | |
| 2019/0088059 | A1 | 3/2019 | Santhosh | |
| 2020/0357209 | A1 | 11/2020 | Kochi | |
| 2021/0266737 | A1* | 8/2021 | Burke | ................ G06F 16/24553 |
| 2021/0385659 | A1* | 12/2021 | Gibbs | ................. G06F 21/6245 |
| 2022/0068070 | A1 | 3/2022 | Ouellette | |

* cited by examiner

*Primary Examiner* — Joseph P Hirl
*Assistant Examiner* — Chi D Nguy
(74) *Attorney, Agent, or Firm* — Kim & Stewart LLP

(57) ABSTRACT

Systems and methods are described for accessing a first user device using a digital badge from a second user device. The digital badge can include information that can be used to identify and authenticate a user profile. In an example, the first and second user devices can be enrolled in a system for managing user devices. A user can select to login to the first user device using a digital badge. The first user device can enable a wireless communication protocol and broadcast a digital badge request that is recognizable by other enrolled devices. The second user device can detect the broadcast and send its digital badge to the first user device. The first user device can send an access request and the digital badge to a server. The server can verify the digital badge, authenticate the user, and notify the first user device. The first user device can then grant the user access without the user inputting any credentials.

15 Claims, 5 Drawing Sheets

USING A DIGITAL BADGE TO ACCESS MANAGED DEVICES

RELATED APPLICATION

Benefit is claimed under 35 U.S.C. 119(a)-(d) to Foreign Application Serial No. 202141053343 filed in India entitled "USING A DIGITAL BADGE TO ACCESS MANAGED DEVICES", on Nov. 19, 2021, by VMware, Inc., which is herein incorporated in its entirety by reference for all purposes.

BACKGROUND

Unified Endpoint Management ("UEM") systems and other device management systems control devices by enrolling the devices on a server. The server then sends profiles to the devices. The profiles can indicate security policies, applications, compliance settings, and files that the user can access as part of their job. Organizations, including enterprises, often implement such device management systems to secure devices for employees and protect data and resources. For example, a launcher application can allow the user to access work-related applications on an enrolled device.

For security purposes, users are required to authenticate before accessing an enrolled device. Some users, such as Information Technology ("IT") employees, access many devices every day to perform the job duties. This can be cumbersome for such users because they must constantly input credentials to access these devices. For example, a user might authenticate on their phone but separately need to authenticate on a tablet and a workstation. Some devices require the user to reauthenticate at set time intervals, thereby encumbering the user even further. Additionally, some shared devices are configured with a check-in and check-out mode so that multiple users can access the device as needed. However, to access such a device, the user must still provide the proper credentials, which can slow the user's ability to quickly access the device.

As a result, a need exists for a secure login method that requires minimal user interaction.

SUMMARY

Examples described herein include systems and methods for accessing a first user device using a digital badge from a second user device. The examples herein describe the user device being accessed as a "multi-user device" and the user device that provides the digital badge as a "single-user device." The multi-user device is described as a user device that is not assigned to any particular user, and the single-user device is described as a user device that is assigned to a particular user. These references are merely exemplary and not meant to be limiting in any way. For example, the multi-user device can also be a single-user device, and vice versa.

In an example, the single-user device can be preconfigured with a digital badge. A digital badge can include data that can be used to authenticate a user or a user device. For example, a digital badge can include a digital key, credentials associated with a user profile, and an identifier associated with a user device. In one example, the digital badge on the single-user device can be associated with a user of the single-user device. For example, the single-user device can be enrolled in a system that manages user devices, such as a UEM system. References made herein to a UEM system are merely exemplary and are not meant to be limiting in any way. For example, references to a UEM system can include any device management system. The single-user device can be enrolled in the UEM under the user's profile. The digital badge can be assigned to the single-user device for purposes of accessing certain locations and devices based on permissions associated with the user.

In an example, the multi-user device can be a user device enrolled in the UEM system, but not to any particular user. However, a user can access the multi-user device without inputting any credentials using the digital badge. For example, the multi-user device can present a login screen with one or more options for logging into the multi-user device. One of the options can include using a digital badge. If the user selects the digital badge option, then the multi-user device can enable one or more wireless communication protocols, such as BLUETOOTH, BLUETOOTH LOW ENEGERY ("BLE"), Near-Field Communication ("NFC"), or ultra-wide band ("UWB"). The multi-user device can send a broadcast on the wireless communication protocol that can be detected by the single-user device.

If the single-user device is within range of the broadcast, the single-user device can open a communication channel with the multi-user device whereby the single-user device can send the digital badge to the multi-user device. For example, the user can place the single-user device next to, on top of, or near the multi-user device. The multi-user device can send the digital badge and an access request to a server in the UEM system. The UEM system can verify the digital badge and authenticate the user with credentials included in the digital badge. The UEM system can then notify the multi-user device that the user is authorized to access the multi-user device. The multi-user device can then grant the user access. In one example, the UEM system can also send policies and settings associated with the user's profile, and the multi-user device can configure a user interface ("UI") based on those policies and settings.

In one example, the UEM system can require that the single-user device with the digital badge remain within range of the multi-user device while the user has access. For example, while the user is logged in, the multi-user device can periodically ping the single-user device. If the single-user device responds, then the multi-user device can wait a predetermined amount of time before sending another ping. If at any point the single-user device does not respond, then the multi-user device can log the user out. This can aid in preventing unauthorized users from accessing the multi-user device. It can also allow the user to log out by simply moving away from the multi-user device with the single-user device.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for accessing a multi-user device using a digital badge from a single-user device. The digital badge can include information that can be used to identify and authenticate a user profile. In an example, the multi-user and single-user devices can be enrolled in a system for managing user devices. A user can select to login to the multi-user device using a digital badge. The multi-user device can enable a wireless communication protocol and broadcast a digital badge request that is recognizable by other enrolled devices. The single-user device can detect the broadcast and send its digital badge to the multi-user device. The multi-user device can send an access request and the digital badge to a server. The server can verify the digital badge, authenticate the user, and notify the multi-user device. The multi-user device can then grant the user access without the user inputting any credentials.

Figure 1:
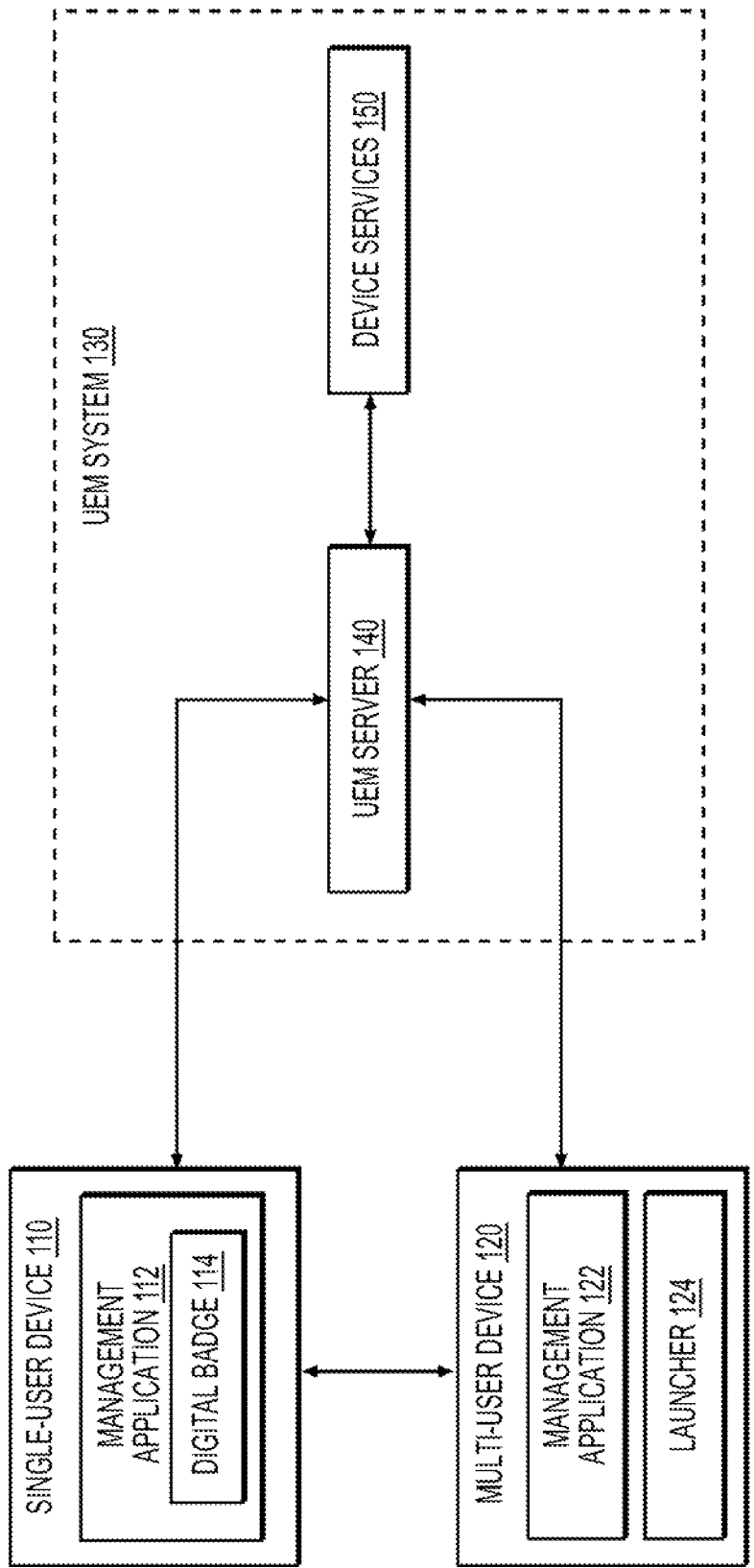
FIG. 1 is an illustration of an example system for accessing a multi-user device using a digital badge.

FIG. 1 is an illustration of an example system for accessing a multi-user device using a digital badge. A single-user device 110 can be enrolled in a UEM system 130. In an example, the single-user device 110 can be a user device that is assigned to a particular user. The single-user device 110 can be one or more processor-based devices, such as a personal computer, tablet, or cell phone. The UEM system 130 can be any system that allows enterprises to manage work-related applications and data on enrolled user devices. Users can enroll their own devices, such as cell phones, tablets, or laptops. Enrollment can include installing managed applications and other resources on the user device.

In an example, the UEM system 130 can include an enrollment server that can be a server responsible for enrolling unenrolled user devices in the UEM system 130. In an example, a UEM server 140 in the UEM system 130 can manage enrolled user devices by sending management instructions to a management application installed on the enrolled user devices, such as the management application 112 on the single-user device 110. The UEM server 140 can be a single server or a group of servers, including multiple servers implemented virtually across multiple computing platforms. The management application 112 can be a stand-alone application, part of an enterprise application, or part of an operating system of the single-user device 110.

In an example, the management application 112 can be responsible for ensuring that the single-user device 110 is up to date with compliance and security settings prior to accessing enterprise data and resources. The management application 112 can communicate with the UEM server 140, allowing UEM management of the single-user device 110 based on compliance and security settings at the UEM server 140. The management application 112 can enforce compliance at the single-user device 110, such as by locking a device, notifying an admin, or wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the single-user device 110 can access enterprise or UEM resources through the UEM server 140. UEM resources can include any type of data or services related to an enterprise or otherwise considered confidential in some respect.

In an example, the management application 112 can include a digital badge 114 that is specific to the user of the single-user device 110. The digital badge 114 can allow a user to access approved locations, systems, or devices without requiring a physical badge or user credentials.

The following is one example of how the single-user device 110 can obtain the digital badge 114 to access a location. When the single-user device 110 enrolls with the UEM system 130, or sometime thereafter, the UEM system 130 can issue an access token to the single-user device 110. The management application 112 can include an interface that the user can use to request a digital badge. The management application 112 can prompt the user to grant location permission settings to the management application 112, such as permission to turn on BLUETOOTH, BLE, NFC, or UWB, and permission to access the location of the single-user device 110. The management application 112 can skip this prompt if the user's policy settings already grant these permissions to the management application 112. The management application 112 can send the access token to the UEM server 140. The UEM server 140 can authenticate the access token and notify a human interface device ("HID") portal. The HID portal can create a record for the user, generate an invite code, and send the invite code to the UEM server 140, which can in turn pass the invite code to the management application 112. An HID software development kit ("SDK") can be integrated with the management application 112. This HID SDK can cause the management application 112 to redeem the invite code from an HID server to obtain a digital key. The management application 112 can store the digital key in a secure location on the single-user device 110. The digital key can constitute all or part of the digital badge, depending on the example. The management application 112 can send a copy of the digital key to the UEM server 140, which can in turn send the digital key to a server of a physical access control system ("PACS"). The PACS server can store the digital key against the user record and activate the digital badge 114 for the user. Whenever the user approaches an HID reader associated with the PACS system, the HID reader can retrieve the digital key and pass it to the PACS server. The PACS server can then compare the digital key to the user record and grant or deny the user access based on that comparison.

As an example, an employee can go to work with the single-user device 110 in his or her possession. The user can enter at an entry point of an office building with a HID system that manages user access. When the user approaches, a HID reader of the HID system can detect the single-user device 110. For example, the user can place or hold the single-user device 110 next to or touching the HID reader, or the HID reader and single-user device 110 can detect each other using BLE. The single-user device 110 and HID reader can exchange information resulting in the single-user device 110 transmitting the digital badge 114 to the HID reader. The HID reader can pass the digital badge 114 to the PACS server. The PACS server can verify the digital badge 114 and then instruct the HID system to let the user access the building.

The example methods included later herein describe how a user can access a multi-user device 120 using the digital badge 114 on the single-user device 110. The multi-user device 120 can be a user device enrolled with the UEM system 130 that is not configured for any particular user. For example, the multi-user device 120 can be configured so that any user within an organization, or group within an organization, can use the multi-user device 120 on a temporary basis with the proper credentials. Alternatively, the multi-user device 120 can be another device that belongs to the user. The multi-user device 120 can include a launcher 124 that manages user access and restricts how the multi-user device 120 can be used. The launcher 124 can be an application launcher that enables an enterprise to lock down user devices for individual use cases and customize the look and behavior of the user devices. For example, the launcher 124 can lock the multi-user device 120 into a single application with no access to other features or settings or disable certain features while the application is in use.

In an example, the UEM system 130 can manage the multi-user device 120 through a management application 122. In one example, the management application 122 can be the same application as the management application 112 on the single-user device 110. For example, the UEM server 130 can send management instructions to the management application 122 to enforce security and policy settings on the multi-user device 120. In one example, the management application 122 can allow an administrator ("admin") user to make configuration changes to the launcher 124. For example, the admin user can make configuration changes in an admin console, which can be a device or UI provided by the UEM system 130. The UEM server 140 can receive the configuration changes and implement them on the multi-user device 120 by sending corresponding instructions to the management application 122. In one example, the launcher 124 can be configured to operate on user devices that include a management mode provided by the original equipment manufacturer ("OEM"), such as ANDROID ENTERPRISE WORK MANAGED MODE.

In an example, the launcher 124 can provide login options for users to select from when accessing the multi-user device 120. For example, a user can select to provide a username and password or a personal identification number ("PIN"), or access the multi-user device 120 using biometrics, such as with a fingerprint reader or eye scan. The multi-user device 120 can also include an option to gain access using a digital badge 114. If the digital badge option is selected, the launcher 124 can be configured to notify the management application 122, and the management application 122 can enable a digital reader mode on the multi-user device 120. Enabling the digital reader mode can cause the multi-user device 120 to enable wireless communication protocols (BLUETOOTH, NFC, UWB, etc.) and location settings, such as global positioning system ("GPS") settings. In an example, the management application 122 can cause the multi-user device 120 to make itself discoverable to other enrolled user devices using one or more of the communication protocols.

In an example, single-user device 110 can be configured to detect other enrolled devices in digital reader mode. For example, the single-user device 110 can listen for a BLE, NFC, or UWB signal from other enrolled user devices. To aid in the detection, the user can place the single-user device 110 near the multi-user device 120 when attempting to access the multi-user device 120 using the digital badge method. After the single-user device 110 detects the multi-user device 120, the single-user device 110 can transfer data related to the digital badge to the multi-user device 120. In one example, the single-user device 110 can send the digital badge data as one or more data files, such as a JavaScript Object Notation ("JSON") file or Extensible Markup Language ("XML") file. In another example, the single-user device 110 can send the digital badge data to the multi-user device using the same communication protocol used when detecting the multi-user device 120. In an example, the multi-user device 120 can be configured to send the digital badge data to the UEM server 140. If the UEM server 140 can authenticate the user with the digital badge data, then the UEM server 140 can notify the multi-user device 120 and the launcher 124 can grant the user access without requiring any input from the user.

Figure 2:
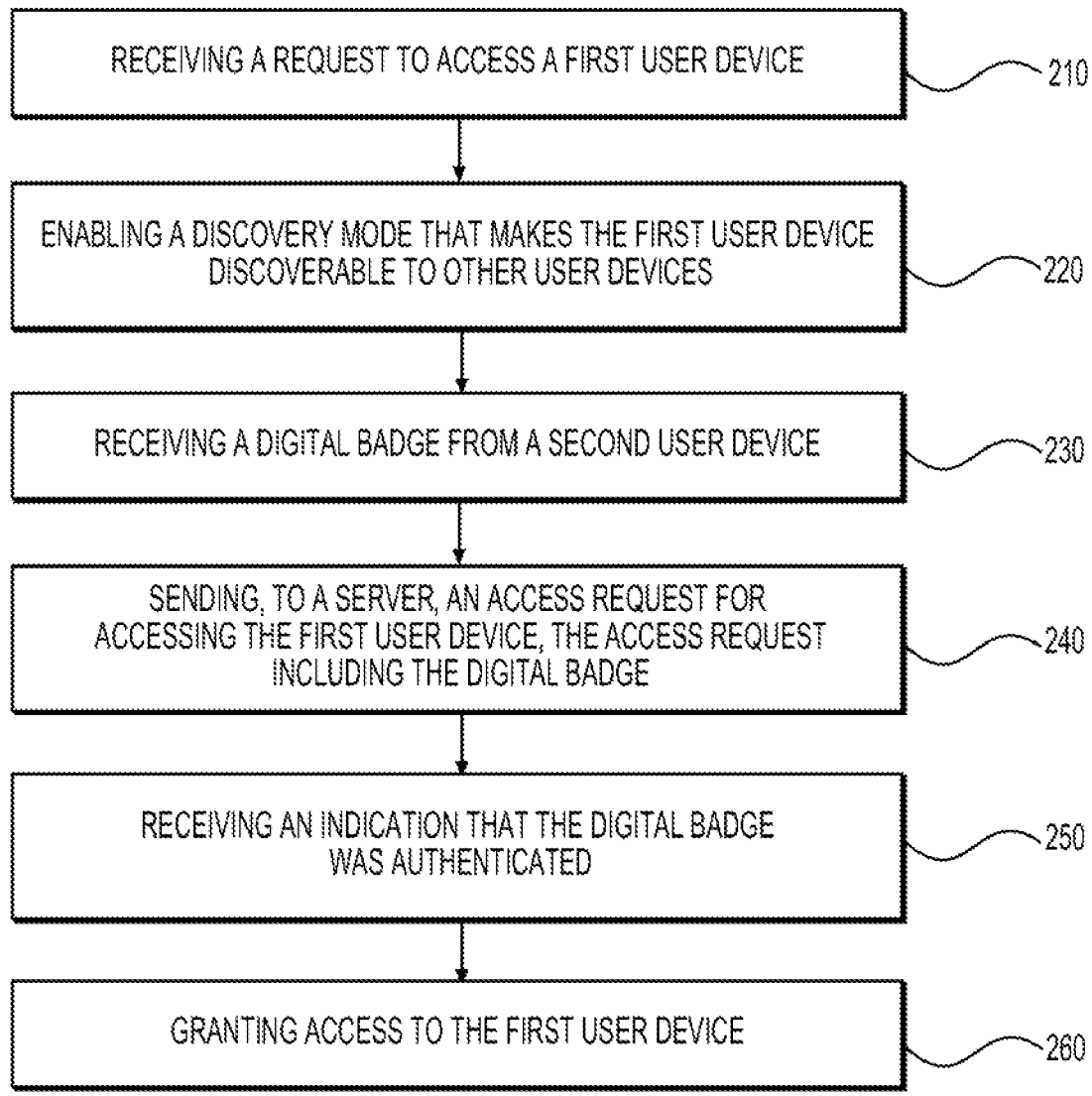
FIG. 2 is a flowchart of an example method for accessing a multi-user device using a digital badge.

FIG. 2 is a flowchart of an example method for accessing a multi-user device using a digital badge. At stage 210, the multi-user device 120 (first user device) can receive an access request. An access request can include input from a user for gaining access to the multi-user device 120. For example, the multi-user device 120 can be a user device that is not assigned to or configured for any specific user. The launcher 124 can present a login screen that includes one or more options that a user can select from for accessing the multi-user device 120. In an example, one such option can include accessing the multi-user device 120 using a digital badge.

If the user selects the digital badge option, then, at stage 220, the multi-user device 120 can enable a discovery mode that makes the multi-user device 120 discoverable to other user devices. For example, the multi-user device 120 can enable location settings and wireless communication protocols like BLUETOOTH, NFC, and UWB. The multi-user device 120 can enable one or multiple wireless communication protocols, depending on the example. In one example, the discovery mode can be enabled by the management application 122 in response to a request from the launcher 124. For example, in response to the user selecting the digital badge login method, the launcher 124 can send instructions to the management application 122. The instructions can include which location settings to enable or configure, any necessary permissions, and which communication protocol(s) to enable in a discovery setting.

In some examples, the multi-user device 120 can require that the settings and communication protocol changes be configured by the management application 122. For example, the multi-user device 120 can be enrolled in a device management mode (e.g., ANDROID ENTERPRISE WORK MANAGED MODE) that restricts access to location settings and communication protocols. The management application 122 can be integrated with the device management mode such that only the management application 122 has permission to make certain changes on the multi-user device 120, such as enabling and disabling communication protocols and modifying location settings. In such an example, the launcher 124 can be configured to request the necessary changes from the management application 122, and the management application 122 can execute the request.

In an example, while in discovery mode the multi-user device 120 can operate like an HID reader device. For example, the launcher 124 can cause the multi-user device 120 to send a broadcast through the wireless communication protocol that can only be detected and interpreted by another device enrolled in the UEM system 130. As an example, the multi-user device 120 can broadcast a signal that is encrypted with a security certificate that only enrolled devices can decrypt. In one example, the broadcast can include an identifier, such as a flag value, that indicates to other enrolled devices that the multi-user device 120 wants to connect to another device that has a digital badge. Enrolled devices that do not have a digital badge can ignore the broadcast. On the other hand, enrolled devices with a digital badge, such as the single-user device 110 (second user device) previously described regarding in FIG. 1, can be configured to detect such a broadcast when placed within range of the broadcast.

At stage 230, the multi-user device 120 can receive the digital badge 114 from the single-user device 110. For example, the user can place the single-user device 110 near the multi-user device 120. Near the multi-user device 120 can mean within detection range of the broadcast, for example. In one example, the launcher 124 can display instructions on the multi-user device 120 for placing a user device with a digital badge next to the multi-user device 120. The single-user device 110 can detect the broadcast. The single-user device 110 can connect to the multi-user device 120 can send the digital badge 114 to the multi-user device 120. In one example, the single-user device 110 can send the digital badge 114 using the same communication protocol used for the broadcast.

In an example, the single-user device 110 and multi-user device 120 can exchange security tokens before the single-user device 110 sends the digital badge 114. For example, the multi-user device 120 can send a public key in an asymmetric key pair to the single-user device 110. The single-user device 110 can encrypt the digital badge 114 with the public key and send the encrypted digital badge 114 to the multi-user device 120. The multi-user device 120 can then decrypt the digital badge 114 using the corresponding private key. In one example, communications between the single-user device 110 and multi-user device 120 can be handled by their respective management applications 112, 122.

The digital badge 114 sent by the single-user device 110 can include information needed by the UEM system 130 to verify the digital badge 114 and authenticate the user. This can include, for example, a u associated with the digital badge 114, credentials associated with the user's profile, and an identifier ("ID") of the single-user device 110, such as an International Mobile Equipment Identity ("IMEI") number or serial and model number. Although references are made herein to transferring the digital badge 114, those references are merely used as examples and are not intended to be limiting in any way. For example, any exchange of the digital badge 114 can encompass an exchange of information related to, or from, the digital badge 114 that can be used to access the multi-user device 120 using the single-user device 110, such as information described above.

In an example, for added security the management application 112 can prompt the user on the single-user device 110 to perform some type of authentication. For example, the user can be prompted to enter a PIN or authenticate using a biometric component of the single-user device 110, such as a fingerprint reader. In one example, the management application 112 can require that the user unlock the single-user device 110 using which method that is configured on the single-user device 110. In another example, if the single-user device 110 is already unlocked when the single-user device 110 detects the broadcast from the multi-user device 120, then the management application 122 can send the digital badge 114 without requiring any additional authentication.

At stage 240, the multi-user device 120 can send an access request with the digital badge 114 to the UEM server 140. In an example, this can be handled by the management application 122. For example, after receiving the digital badge 114 from the single-user device 110, the management application 122 can send the digital badge 114 to the UEM server 140. The UEM server 140 can send the digital badge 114, or a portion thereof, to the device services 150 for verification. As an example, the digital badge 114 can include a digital key that the device services 150 can use the verify the single-user device 110. For example, the description of FIG. 1 above includes an example of how the single-user device 110 can obtain the digital badge 114 to access a location using a digital badge. In that example, a digital key assigned to the single-user device 110 is provided to a PACS server, and the PACS server stores the digital key and correlates it with the single-user device 110. In that example, the device services 150 can also be provided with the digital key and information associating it with the single-user device 110. The UEM server 140 can send the digital key to the device services 150, and the device services 150 can verify that the digital key is valid.

In an example, if the device services 150 can successfully verify the digital key, the device services 150 can notify the UEM server 140. The UEM server 140 can then authenticate credentials included in the digital key 114, thus completing a two-step verification of the digital badge 114 and consequently the single-user device 110 as well. In one example, the UEM server 140 can also check the user's permissions to verify that the user has permissions to access the multi-user device 120.

Assuming the verifications and authentications are successful, at stage 250 the multi-user device 120 can receive an indication of such. In an example, this can be as simple as the UEM server 140 sending a message with a message or value the management application 122 recognizes as an indication that the user can access the multi-user device 120. The UEM server 140 can notify the multi-user device 120 using a Hypertext Transfer Protocol ("HTTP") call or Application Programming Interface ("API"), for example.

At stage 260, the multi-user device 120 can grant the user access to the multi-user device 120. For example, the management application 122 can notify the launcher 124 that the digital badge 114 was successfully verified, and the launcher 124 can grant the user access to the multi-user device 120. In one example, the UEM server 140 can provide configuration settings specific to the user's profile, which the launcher 124 can apply when granting the user access. For example, the configuration settings can indicate whether the user has admin or other rights, which applications and services to load, and any UEM services the user can have access to through the multi-user device 120.

The method described above allows the user to securely access the multi-user device 120 without inputting any credentials. For example, to access the multi-user device 120, the user need only select a digital badge access method on the multi-user device 120 and place the single-user device 110, unlocked, near the multi-user device 120 so that they can directly communicate.

Figure 3:
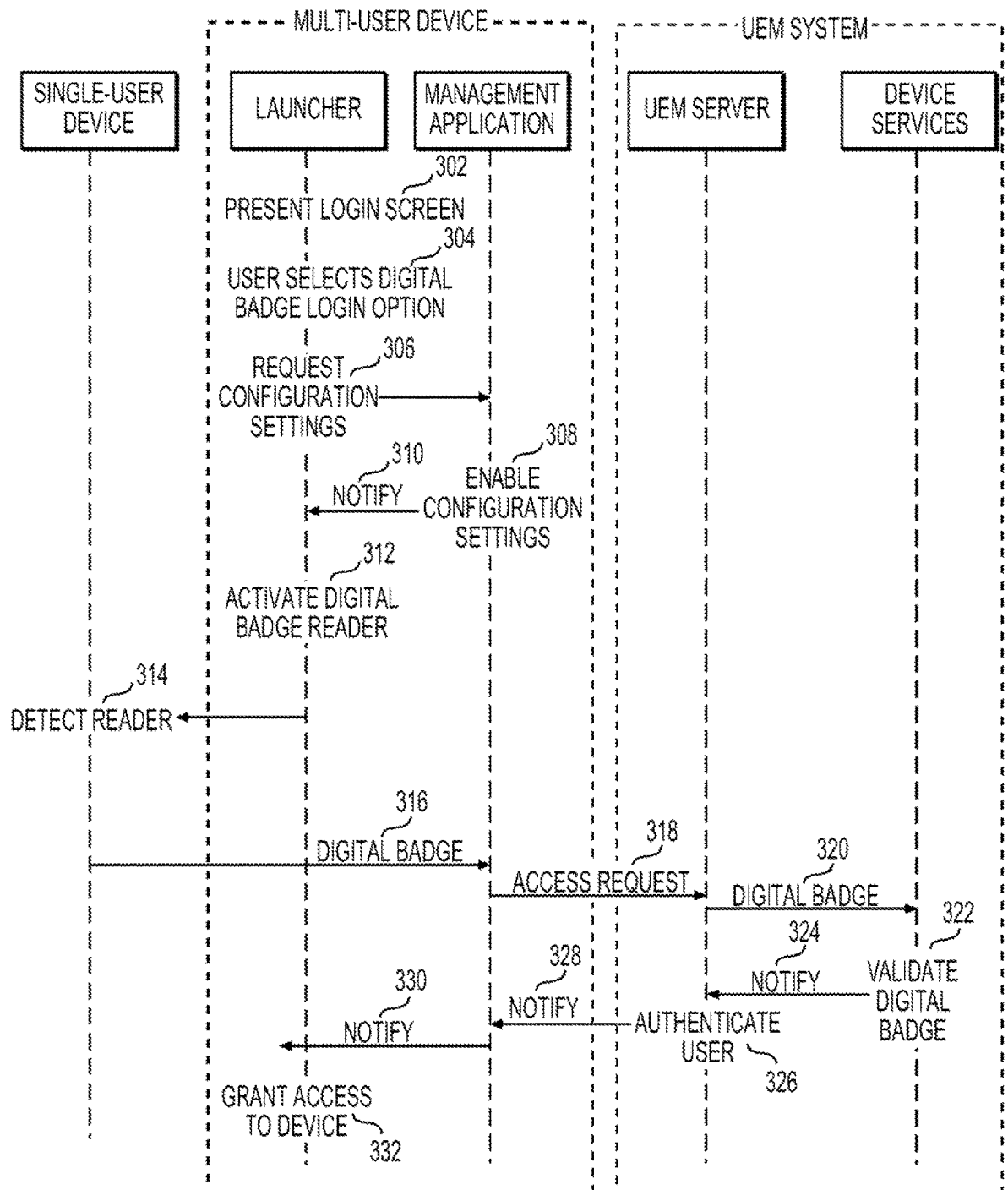
FIG. 3 is a sequence diagram of an example method for accessing a multi-user device using a digital badge.

FIG. 3 is a sequence diagram of an example method for accessing the multi-user device 120 using the digital badge 114. At stage 302, the launcher 124 can present a login screen on the multi-user device 120. For example, when no user is logged into the multi-user device 120, the launcher 124 can display a login screen that any user with the proper credentials can use for accessing the multi-user device 120.

In an example, the login screen can include an option to login using a digital badge, and, at stage 304, the user can select this option.

At stage 306, the launcher 124 can send a request to the management application 122 to enable configuration settings associated with a digital badge login. For example, the launcher 124 can request that the management application 122 enable location settings and one or more wireless communication protocols, such as BLUETOOTH, NFC, and UWB. At stage 308, the management application 112, which can have the proper permissions on the multi-user device 120, can enable the configuration settings. For example, the management application 112 can enable BLUETOOTH, NFC, or UWB in a discoverable mode so that other enrolled devices can detect the multi-user device 120.

At stage 310, the management application 112 can notify the launcher 124 that the configuration settings are enabled. In response, at stage 312, the launcher 124 can activate a digital badge reader. In an example, the digital badge reader can be a broadcast sent through the enabled wireless communication protocol. The broadcast can include an identifier, such as a flag value, recognizable by other enrolled devices. In one example, the broadcast can be encrypted using a security key provided to all devices enrolled in the UEM system 130 so that only such devices can understand the broadcast.

At stage 314, the single-user device 110 can detect the digital badge reader. This can include recognizing a request to connect or a request for a digital badge. For example, the management application 112 can configure the single-user device 110 to listen for broadcasts on one or more wireless communication protocol. When the single-user device 110 is within range of the broadcast, the management application 112 can detect the broadcast and identify it as a digital badge reader. When a digital badge reader is detected, the management application 112 can be configured to connect to the corresponding device. In one example, the single-user device 110 using the same communication protocol used to send the broadcast.

At stage 316, the single-user device 110 can send the digital badge 114 to the management application 122. In an example, the single-user device 110 and multi-user device 120 can exchange security tokens before the single-user device 110 sends the digital badge 114. For example, the multi-user device 120 can send a public key in an asymmetric key pair to the single-user device 110. The single-user device 110 can encrypt the digital badge 114 with the public key and send the encrypted digital badge 114 to the multi-user device 120. The multi-user device 120 can then decrypt the digital badge 114 using the corresponding private key. In one example, communications between the single-user device 110 and multi-user device 120 can be handled by their respective management applications 112, 122.

The digital badge 114 sent by the single-user device 110 can include information needed by the UEM system 130 to verify the digital badge 114 and authenticate the user. This can include, for example, a digital key associated with the digital badge 114, credentials associated with the user's profile, and an ID of the single-user device 110, such as an IMEI number or serial and model number. Although references are made herein to transferring the digital badge 114, those references are merely used as examples and are not intended to be limiting in any way. For example, any exchange of the digital badge 114 can encompass an exchange of information related to, or from, the digital badge 114 that can be used to access the multi-user device 120 using the single-user device 110.

In an example, for added security the management application 112 can prompt the user on the single-user device 110 to perform some type of authentication prior to sending the digital badge at stage 316. For example, the user can be prompted to enter a PIN or authenticate using a biometric component of the single-user device 110, such as a fingerprint reader. In one example, the management application 112 can require that the user unlock the single-user device 110 using which method that is configured on the single-user device 110. In another example, if the single-user device 110 is already unlocked when the single-user device 110 detects the broadcast from the multi-user device 120, then the management application 122 can place a prompt or notification on the screen of the single-user device or send the digital badge 114 without requiring any additional input or authentication.

At stage 318, the management application 122 can cause the multi-user device 120 to send an access request with the digital badge 114 to the UEM server 140. In an example, the multi-user device 120 can send the request and digital badge 114 as one or more data files, such as JSON or XML files. The data files can be sent using a network communication protocol, such as an HTTP or API call.

Upon receiving the access request, at stage 320 the UEM server 140 can send the digital badge 114 to the device services 150. The device services 150 can then validate the digital badge 114 at stage 322. As an example, the digital badge 114 can include a user ID associated with the user's profile and a corresponding digital key. The device services 150 can include, or have access to, a database with a data table that associates user profiles with digital keys. The device services 150 can validate the digital badge 114 by verifying that the user ID and digital key match according to the data table. If the device services 150 can successfully validate the digital badge 114, the device services 150 can notify the UEM server 140 at stage 324.

At stage 326, the UEM server 140 can authenticate the user. For example, the digital badge 114 can include credentials for the user's profile, such as the user ID and a password. In one example, the UEM server 140 can authenticate the user with a security key specific to the user's account. Such a security key can be included in the digital badge 114 or provided separately, depending on the example. In one example, the security key can be an access token assigned to the single-user device 110 during enrollment.

After authenticating the user, at stage 328, the UEM server 140 can notify the management application 122. For example, the UEM server 140 can send a message or a notification with a value indicating that authentication was successful. At stage 330, the management application 122 can notify the launcher 124. Finally, at stage 332, the launcher 124 can grant access to the multi-user device 120. In one example, the launcher 124 can have a default configuration for all users, and the launcher can load a UI with a default configuration. In another example, some settings in the UI can be user-specific, such as permissions, security settings, and which applications can be used. In such an example, the UEM server 140 can send any necessary instructions and settings to the management application 122, and the management application 122 can communicate with the launcher 124 to properly configure the multi-user device 120 for the user.

Using the method described above, a user can securely access the multi-user device 120 without providing any credentials. Indeed, the user need only place the single-user device 110 near the multi-user device 120 when logging in.

The UEM system 130 can use the digital badge 114 on the single-user device 110 to authenticate the user. The only actions required by the user may include selecting a digital badge login option and, in some examples, providing a PIN or other simplified verification method on the single-user device 110.

Figure 4:
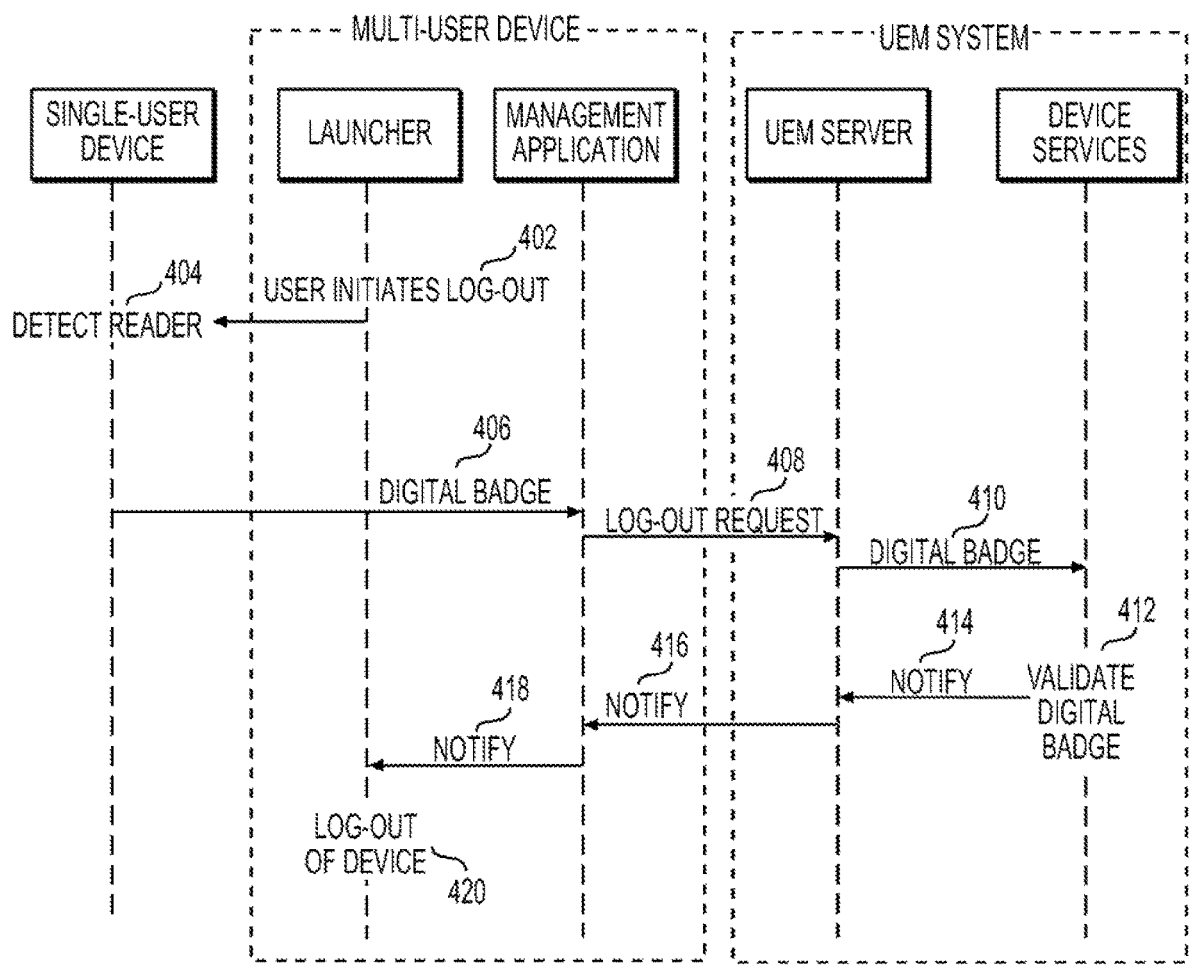
FIG. 4 is a sequence diagram of an example method for logging out of a multi-user device using a digital badge.

FIG. 4 is a sequence diagram of an example method for logging out of the multi-user device 120 using the digital badge 114. At stage 402, the user can initiate log-out of the multi-user device 120. For example, the user can select an option in the UI for logging out, shutting down, or restarting the multi-user device 120. In an example, in response to the log-out selection, the launcher can initiate the digital badge reader. At stage 404, the single-user device 110 can detect the digital badge reader.

At stage 406, the single-user device 110 can send the digital badge 114 to the management application 122. In one example, the single-user device 110 can encrypt the digital badge 114 before sending. For example, the single-user device 110 and multi-user device 120 can exchange public keys so that they can communicate securely. The single-user device 110 can then encrypt the digital badge 114 with the public key of the multi-user device 120 before sending.

At stage 408, the multi-user device 120 can send a log-out request with the digital badge 114 to the UEM server 140. In one example, this stage can be handled by the management application 122. For example, the management application 122 can instruct the multi-user device 120 to send the digital badge using a certain communication protocol, such as an HTTP or API call.

At stage 410, the UEM server 140 can send the digital badge 114 to the device services 150. The device services 150 can then validate the digital badge 114 at stage 412. For example, the digital badge 114 can include a user ID associated with the user's profile and a corresponding digital key. The device services 150 can include, or have access to, a database with a data table that associates user profiles with digital keys. The device services 150 can validate the digital badge 114 by verifying that the user ID and digital key match according to the data table. If the device services 150 can successfully validate the digital badge 114, the device services 150 can notify the UEM server 140 at stage 414.

At stage 416, the UEM server 140 can notify the management application 112 that the log-out request is approved, and at stage 418, the management application 122 can notify the launcher 124. The launcher 124, now having approval for the logout, can log the user out of the multi-user device 120 at stage 420.

Using the digital badge 114 for facilitating logging out of the multi-device 120 can be particularly useful in certain situations. For example, in examples where the multi-user device 120 can be checked out by various users, the digital badge 114 can be used to verify that the same user that checked out the multi-user device 120 is the same user that checks in the multi-user device. The digital badge 114 can also be used to ensure that another user does not log the user out without the user's permission. In one example, the multi-user device 120 can be configured to retrieve the digital badge 114 and log the user out if the multi-user device 120 sits idle for a predetermined amount of time. The user can thereby log out without having to unlock the multi-user device 120. In one example, the multi-user device 120 can require a user authenticate each time the display turns off or after some other similar event. If the user forgets the access credential, then the multi-user device 120 can include an option on the locked screen for logging out. The multi-user device 120 can use the digital badge 114 to log the user out, thereby verifying that the same user logged in and out of the multi-user device 120.

Figure 5:
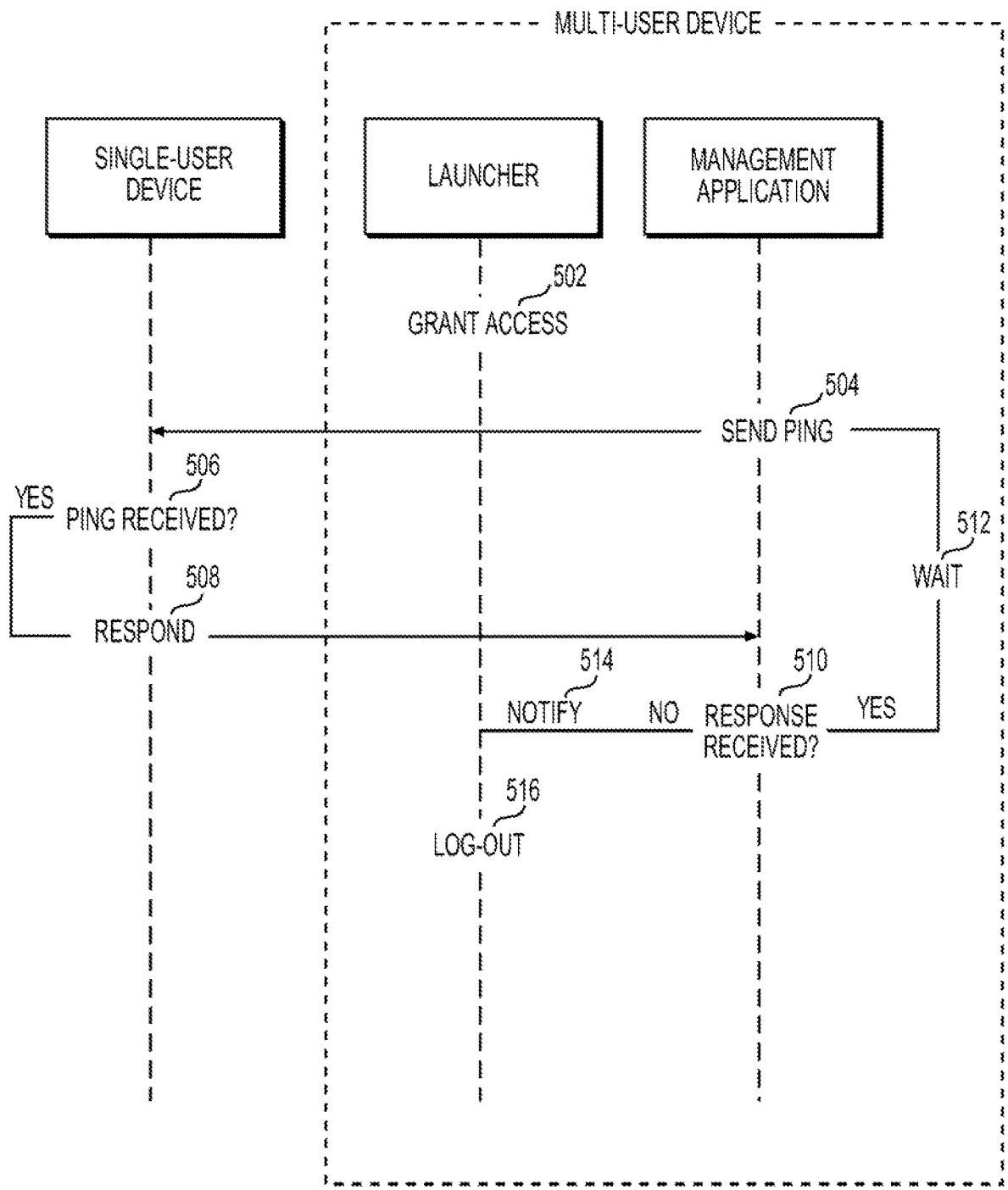
FIG. 5 is a sequence diagram of another example method for logging out of a multi-user device using a digital badge.

FIG. 5 is a sequence diagram of another example method for accessing the multi-user device 120 using the digital badge 114. The method described below illustrates one example method for securing the multi-user device 120 by logging the user out if multi-user device 120 cannot detect the single-user device 110 while the user is logged in. At stage 502, the user of the single-user device 110 can access the multi-user device 120 using the digital badge 114. In an example, the user can access the multi-user device 120 using the method described above regarding FIG. 3. For example, stage 502 can correspond to stage 332 of FIG. 3. As a result, the multi-user device 120 can recognize the single-user device 110 as the device that the user authenticated with to access the multi-user device 120.

At stage 504, the management application 122 can instruct the multi-user device 120 to ping the single-user device 110. The ping can be any type of test to verify that the single-user device 110 is still reachable. In one example, the multi-user device 120 can use a method to verify that the single-user device 110 is nearby. For example, the multi-user device 120 can ping the single-user device 110 using wireless protocol with limited range, such as BLUETOOTH or NFC.

At stage 506, if the single-user device 110 receives the ping, the method can proceed to stage 508 where the single-user device 110 can respond to the ping. For example, the single-user device 110 can send a small data packet confirming that the ping was received. Of course, if the single-user device 110 does not receive the ping, then stage 508 would not occur. This can occur, for example, if the user takes the single-user device 110 out of range from the multi-user device 120, or vice versa.

At stage 510, if the management application 122 receives a response from the single-user device 110, the method can proceed to stage 512 where the management application 122 can wait a predetermined amount of time. For example, the management application 122 can be configured to ping the single-user device 110 at regular intervals to verify that the single-user device 110 is still within range. For example, the single-user device 110 can send a ping every 30 seconds, minute, or 5 minutes. Each time as response is received, the multi-user device 120 can wait the predetermined amount of time before returning to stage 504 and sending other ping.

If at any point the management application 122 does not receive a response from the single-user device 110 at stage 510, then the method can proceed to stage 514 where the management application 122 can notify the launcher 124. Then, at stage 516, the launcher 124 can log the user out of the multi-user device 120. For example, as a security measure, the user can be required to keep the use device used to access the multi-user device 120 nearby while the multi-user device 120 is being accessed. This can help prevent unauthorized access in case, for example, the user leaves the multi-user device 120 somewhere and leaves with his personal device (the single-user device 110). If the multi-user device 120 detects that the single-user device 110 is gone (e.g., no ping response), then the management application 122 can be configured to log the user out of the launcher 124 so that no unauthorized user gets access.

In another example, when a ping is not received, the management application 122 can prompt the user on the multi-user device 120 that the single-user device 110 is no longer detected. The user can be given a short time period, such as 15 seconds to move closer to the single-user device 110. Then an additional ping can be sent from the management application 122. If no response is received again at stage 510, then the launcher can be notified at stage 514 and log out the user at stage 516.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for granting access to a secured device based on a digital badge stored by a user device of a user, the method comprising:
   receiving a request for the user to access the secured device, wherein the secured device is enrolled for management by a unified endpoint management (UEM) server and wherein the secured device contains a security key received from the UEM server upon enrollment;
   in response to receiving the request to access the secured device, updating at least one discovery setting in the secured device to enable the secured device to communicate using a wireless communication protocol;
   sending, by the secured device, a broadcast message encrypted by the security key using the wireless communication protocol, wherein the broadcast message is decrypted by the user device using the security key, wherein the user device is enrolled for management with the UEM server and contains the security key received from the UEM server upon enrollment;
   establishing a communication channel between the secured device and the user device using the wireless communication protocol and then receiving the digital badge from the user device over the communication channel;
   sending, from the secured device to the UEM server, an access request for granting the user access to the secured device, the access request including the digital badge;
   in response to the access request, receiving, from the UEM server, an indication that the digital badge has been authenticated and a security policy associated with the user, wherein the UEM server retrieves the security policy based on the digital badge; and
   granting the user access to the secured device based on the indication and the security policy received from the UEM server.

2. The method of claim 1, wherein the wireless communication protocol includes at least one of BLUETOOTH, Near-Field Communication (NFC), and ultra-wide band (UWB).

3. The method of claim 1, wherein the digital badge includes at least one of a digital key, credentials associated with a profile of the user, and an identifier associated with the user device.

4. The method of claim 1,
   wherein the secured device is enrolled for management with the UEM server in a device management mode that restricts access by the secured device to location settings or wireless communication protocols.

5. The method of claim 1, further comprising:
   after granting the user access to the secured device, sending a ping request to the user device; and
   in response to a predetermined amount of time elapsing without receiving a response to the ping request, logging the user out of the secured device.

6. The method of claim 1, further comprising:
   configuring a user interface (UI) of the secured device based on the security policy received from the UEM server, wherein the UI is configured to enable access to one or more applications or files that the user is allowed to access.

7. A non-transitory, computer-readable medium containing instructions that, when executed by a hardware-based processor, cause the processor to perform a method for granting access to a secured device based on a digital badge stored by a user device of a user, wherein the method comprises:
   receiving a request for the user to access the secured device, wherein the secured device is enrolled for management by a unified endpoint management (UEM) server and wherein the secured device contains a security key received from the UEM server upon enrollment;
   in response to receiving the request to access the secured device, updating at least one discovery setting in the secured device to enable the secured device to communicate using a wireless communication protocol;
   sending, by the secured device, a broadcast message encrypted by the security key using the wireless communication protocol, wherein the broadcast message is decrypted by the user device using the security key, wherein the user device is enrolled for management with the UEM server and contains the security key received from the UEM server upon enrollment;
   establishing a communication channel between the secured device and the user device using the wireless communication protocol and then receiving the digital badge from the user device over the communication channel;
   sending, from the secured device to the UEM server, an access request for granting the user access to the secured device, the access request including the digital badge;
   in response to the access request, receiving, from the UEM server, an indication that the digital badge has been authenticated and a security policy associated with the user, wherein the UEM server retrieves the security policy based on the digital badge; and
   granting the user access to the secured device based on the indication and the security policy received from the UEM server.

8. The non-transitory, computer-readable medium of claim 7, wherein the wireless communication protocol includes at least one of BLUETOOTH, Near-Field Communication (NFC), and ultra-wide band (UWB).

9. The non-transitory, computer-readable medium of claim 7, wherein the digital badge includes at least one of a digital key, credentials associated with a profile of the user, and an identifier associated with the user device.

10. The non-transitory, computer-readable medium of claim 7, wherein the secured device is enrolled with the UEM server in a device management mode that restricts access by the secured device to location settings or wireless communication protocols.

11. The non-transitory, computer-readable medium of claim 7, wherein the method further comprises:
    after granting the user access to the secured device, sending a ping request to the user device; and
    in response to a predetermined amount of time elapsing without receiving a response to the ping request, logging the user out of the secured device.

12. The non-transitory, computer-readable medium of claim 7, wherein the method further comprises:
    configuring a user interface (UI) of the secured device based on the security policy received from the UEM server, wherein the UI is configured to enable access to one or more applications or files that the user is allowed to access.

13. A secured device including a hardware-based processor configured to execute instructions from a memory storage to carry out a method for granting access to the secured device based on a digital badge stored by a user device of a user, by performing the following steps:
    receiving a request for the user to access the secured device, wherein the secured device is enrolled for management by a unified endpoint management (UEM) server and wherein the secured device contains a security key received from the UEM server upon enrollment;
    in response to receiving the request to access the secured device, updating at least one discovery setting in the secured device to enable the secured device to communicate using a wireless communication protocol;
    sending, by the secured device, a broadcast message encrypted by the security key using the wireless communication protocol, wherein the broadcast message is decrypted by the user device using the security key, wherein the user device is enrolled for management with the UEM server and contains the security key received from the UEM server upon enrollment;
    establishing a communication channel between the secured device and the user device using the wireless communication protocol and then receiving the digital badge from the user device over the communication channel;
    sending, from the secured device to the UEM server, an access request for granting the user access to the secured device, the access request including the digital badge;
    in response to the access request, receiving, from the UEM server, an indication that the digital badge has been authenticated and a security policy associated with the user, wherein the UEM server retrieves the security policy based on the digital badge; and
    granting the user access to the secured device based on the indication and the security policy received from the UEM server.

14. The secured device of claim 13, wherein
    the secured device is enrolled for management with the UEM server in a device management mode that restricts access by the secured device to location settings or wireless communication protocols.

15. The secured device system of claim 13, wherein the steps further include:
    after granting the user access to the secured device, sending a ping request to the user device; and
    in response to a predetermined amount of time elapsing without receiving a response to the ping request, logging the user out of the secured device.

* * * * *